United States Patent
Lee et al.

(10) Patent No.: US 11,301,074 B2
(45) Date of Patent: *Apr. 12, 2022

(54) INPUT SENSING DEVICE AND DISPLAY DEVICE INCLUDING THE SAME

(71) Applicant: SAMSUNG DISPLAY CO., LTD., Yongin-si (KR)

(72) Inventors: In Nam Lee, Yongin-si (KR); Young Sik Kim, Yongin-si (KR); Hyun Jae Lee, Seongnam-si (KR); Mi Young Kim, Hwaseong-si (KR); Sung Hwan Kim, Ulsan (KR); Chang Bum Kim, Pyeongtaek-si (KR); Hyung Chul Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,765

(22) Filed: Jan. 19, 2021

(65) Prior Publication Data
US 2021/0165519 A1    Jun. 3, 2021

Related U.S. Application Data

(63) Continuation of application No. 16/299,280, filed on Mar. 12, 2019, now Pat. No. 10,928,941.

(30) Foreign Application Priority Data

Apr. 27, 2018 (KR) .................. 10-2018-0049172

(51) Int. Cl.
*G06F 3/041* (2006.01)
*G06F 3/044* (2006.01)
(Continued)

(52) U.S. Cl.
CPC ............ *G06F 3/0412* (2013.01); *G01L 1/142* (2013.01); *G01L 1/22* (2013.01); *G06F 3/044* (2013.01);
(Continued)

(58) Field of Classification Search
None
See application file for complete search history.

(56) References Cited

U.S. PATENT DOCUMENTS

2014/0062933 A1    3/2014   Coulson et al.
2015/0015532 A1*   1/2015   Choung ............... G06F 3/0445
                                                          345/174
(Continued)

FOREIGN PATENT DOCUMENTS

KR    1020160000100    1/2016

OTHER PUBLICATIONS

Extended European Search Report dated Jul. 19, 2019 in corresponding Application No. EP19170979.9.
(Continued)

*Primary Examiner* — Krishna P Neupane
(74) *Attorney, Agent, or Firm* — F. Chau & Associates, LLC

(57) ABSTRACT

An input sensing device includes a first base layer, a plurality of first sensing electrodes, a plurality of second sensing electrodes, a plurality of third sensing electrodes, and a plurality of fourth sensing electrodes. The first sensing electrodes are arranged on the first base layer along a first direction. The second sensing electrodes are arranged on the first base layer in different rows from the first sensing electrodes. The third sensing electrodes are arranged on the second sensing electrodes along a second direction different from the first direction. The third sensing electrodes overlap the second sensing electrodes. The fourth sensing electrodes (Continued)

are arranged on the same layer as the third sensing electrodes and overlap the first sensing electrodes. A constant voltage is applied to the third sensing electrodes during a touch pressure sensing operation.

19 Claims, 12 Drawing Sheets

(51) Int. Cl.
  *G01L 1/14* (2006.01)
  *G01L 1/22* (2006.01)
(52) U.S. Cl.
  CPC .. *G06F 3/0416* (2013.01); *G06F 2203/04112* (2013.01)

(56) References Cited

U.S. PATENT DOCUMENTS

| | | |
|---|---|---|
| 2015/0115254 A1 | 4/2015 | Cho et al. |
| 2017/0045992 A1 | 2/2017 | Lee et al. |
| 2017/0315658 A1 | 11/2017 | Vandermeijden et al. |
| 2018/0095582 A1* | 4/2018 | Hwang ................ H01L 27/323 |
| 2019/0089353 A1* | 3/2019 | Araumi ............... G06F 3/04144 |
| 2019/0332210 A1 | 10/2019 | Lee et al. |

OTHER PUBLICATIONS

Office Action dated Jan. 9, 2020 in Corresponding U.S. Appl. No. 16/299,280.

* cited by examiner

INPUT SENSING DEVICE AND DISPLAY DEVICE INCLUDING THE SAME

CROSS-REFERENCE TO RELATED APPLICATION

This application is a continuation of U.S. patent application Ser. No. 16/299,280 filed Mar. 12, 2019, which claims priority under 35 U.S.C. § 119 to Korean Patent Application No. 10-2018-0049172 filed on Apr. 27, 2018, in the Korean Intellectual Property Office, the disclosures of which are incorporated by reference herein in their entirety.

TECHNICAL FIELD

Exemplary embodiments of the present invention relate to an input sensing device and a display device including the same.

DISCUSSION OF THE RELATED ART

Commonly used types of display devices include liquid crystal display (LCD) devices and organic light emitting diode (OLED) display devices.

LCD devices are among the most widely used types of flat panel display devices. An LCD device includes two substrates including electric field generating electrodes such as a pixel electrode and a common electrode, and a liquid crystal layer disposed therebetween. In the LCD device, a voltage is applied to the electric field generating electrodes to form an electric field in the liquid crystal layer. As a result, the alignment of liquid crystal molecules in the liquid crystal layer is determined, and the polarization of incident light is controlled, thereby displaying an image.

OLED display devices display an image using an organic light emitting element that generates light by recombination of electrons and holes. OLED display devices have advantageous characteristics such as, for example, high response speed, high luminance, a wide viewing angle, and low power consumption.

SUMMARY

Exemplary embodiments of the present invention provide an input sensing device capable of detecting a touch position and a touch pressure through a single module, and a display device including the input sensing device.

Exemplary embodiments of the present invention provide an input sensing device capable of detecting a touch pressure through a resistance sensing method and a capacitive method, and a display device including the same.

According to an exemplary embodiment of the present invention, an input sensing device includes a first base layer, a plurality of first sensing electrodes, a plurality of second sensing electrodes, a plurality of third sensing electrodes, and a plurality of fourth sensing electrodes. The plurality of first sensing electrodes is arranged on the first base layer along a first direction. The plurality of second sensing electrodes is arranged on the first base layer (e.g., arranged on the same layer as the plurality of first sensing electrodes) and is arranged in different rows from the plurality of first sensing electrodes. The plurality of third sensing electrodes is arranged on the plurality of second sensing electrodes along a second direction different from the first direction. The plurality of third sensing electrodes overlaps the plurality of second sensing electrodes. The plurality of fourth sensing electrodes is arranged on the same layer as the plurality of third sensing electrodes and overlaps the plurality of first sensing electrodes. A constant voltage is applied to the plurality of third sensing electrodes during a touch pressure sensing operation.

According to an exemplary embodiment of the present invention, a display device includes a display panel and an input sensing panel disposed over the display panel. The input sensing panel includes a plurality of first sensing electrodes, a plurality of second sensing electrodes, a plurality of third sensing electrodes, and a plurality of fourth sensing electrodes. The plurality of first sensing electrodes is arranged along a first direction. The plurality of second sensing electrodes is arranged on the same layer as the plurality of first sensing electrodes and is arranged in different rows from the plurality of first sensing electrodes. The plurality of third sensing electrodes is arranged on the plurality of second sensing electrodes along a second direction different from the first direction, and overlaps the plurality of second sensing electrodes. The plurality of fourth sensing electrodes is arranged on the same layer as the plurality of third sensing electrodes and overlaps the plurality of first sensing electrodes. A constant voltage is applied to the plurality of third sensing electrodes during a touch pressure sensing operation.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
FIG. 1 is a cross-sectional view of a display device according to an exemplary embodiment of the present invention.

Exemplary embodiments of the present invention will be described more fully hereinafter with reference to the accompanying drawings. Like reference numerals may refer to like elements throughout the accompanying drawings.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected, or coupled to the other element or layer, or intervening elements or layers may be present. In addition, it will also be understood that when an element or layer is referred to as being "between" two elements or layers, it can be the only element or layer between the two elements or layers, or one or more intervening elements or layers may also be present.

Although the terms "first", "second", etc. may be used herein to describe various elements, these elements are not limited by these terms. These terms may be used to distinguish one element from another element. Thus, a first element discussed below may be termed a second element without departing from teachings of one or more exemplary embodiments. The description of an element as a "first" element may not require or imply the presence of a second element or other elements. The terms "first", "second", etc. may also be used herein to differentiate different categories or sets of elements.

Spatially relative terms, such as "beneath", "below" "lower" "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

FIG. 1 is a cross-sectional view of a display device according to an exemplary embodiment of the present invention.

Referring to FIG. 1, in an exemplary embodiment, a display device includes a display panel 100, an input sensing panel 200, an anti-reflective panel 300, and a window panel 400. The input sensing panel 200 may also be referred to herein as a pressure sensing panel. Herein, the configuration combined with another component through an adhesive member will be expressed by a "panel". Further, the configuration combined with another component through a continuous process will be expressed by a "layer". The panel includes a base layer providing a base surface. In contrast, in exemplary embodiments, the layer does not include the base layer. That is, the expression "layer" refers to a structure disposed on the base surface provided by another component. In an exemplary embodiment, the base layer may include, for example, a synthetic resin film, a composite material film, a glass substrate, etc.

The display panel 100 is defined as a panel for displaying an image. In an exemplary embodiment, the display panel 100 may be, for example, an organic light emitting display panel, a liquid crystal display panel, a quantum dot display panel, etc.

In an exemplary embodiment, the input sensing panel 200 is disposed over the display panel 100. In an exemplary embodiment, the display panel 100 and the input sensing panel 200 are coupled to each other through a first adhesive member 510. The input sensing panel 200 may sense the position and pressure of, for example, a user's finger or a touch pen. That is, the input sensing panel 200 may sense both the position and pressure of a touch, as described in further detail below. The input sensing panel 200 may be referred to as an input sensing device before it is attached to the display panel 100.

In an exemplary embodiment, the anti-reflective panel 300 is disposed over the input sensing panel 200. In an exemplary embodiment, the anti-reflective panel 300 and the input sensing panel 200 are coupled to each other through a second adhesive member 520. The anti-reflective panel 300 may reduce the reflectance of external light incident from above the window panel 400. In an exemplary embodiment, the anti-reflective panel 300 may include a retarder and a polarizer. Further, the anti-reflective panel 300 may include a black matrix and a color filter. Further, in an exemplary embodiment, the anti-reflective panel 300 may be omitted.

In an exemplary embodiment, the window panel 400 is disposed over the anti-reflective panel 300. In an exemplary embodiment, the window panel 400 and the anti-reflective panel 300 are coupled to each other through a third adhesive member 530. The window panel 400 may protect the display panel 100 and/or the input sensing panel 200 from damage such as, for example, external scratches.

In an exemplary embodiment, each of the first to third adhesive members 510 to 530 may be a pressure-sensitive adhesive (PSA) member, an optical clear adhesive (OCA) member, or an optical clear resin (OCR) film. Unlike as described above, in an exemplary embodiment, at least one of the input sensing panel 200, the anti-reflective panel 300, and the window panel 400 may be formed in the form of a "layer" having an upper surface of another component as a base layer. For example, the input sensing panel 200 may be formed as an input sensing layer having an upper surface of the display panel 100 as a base surface. That is, the input sensing layer may be formed together with the display panel 100 through a continuous process.

Hereinafter, the input sensing panel 200 will be described in more detail.

Figure 2:
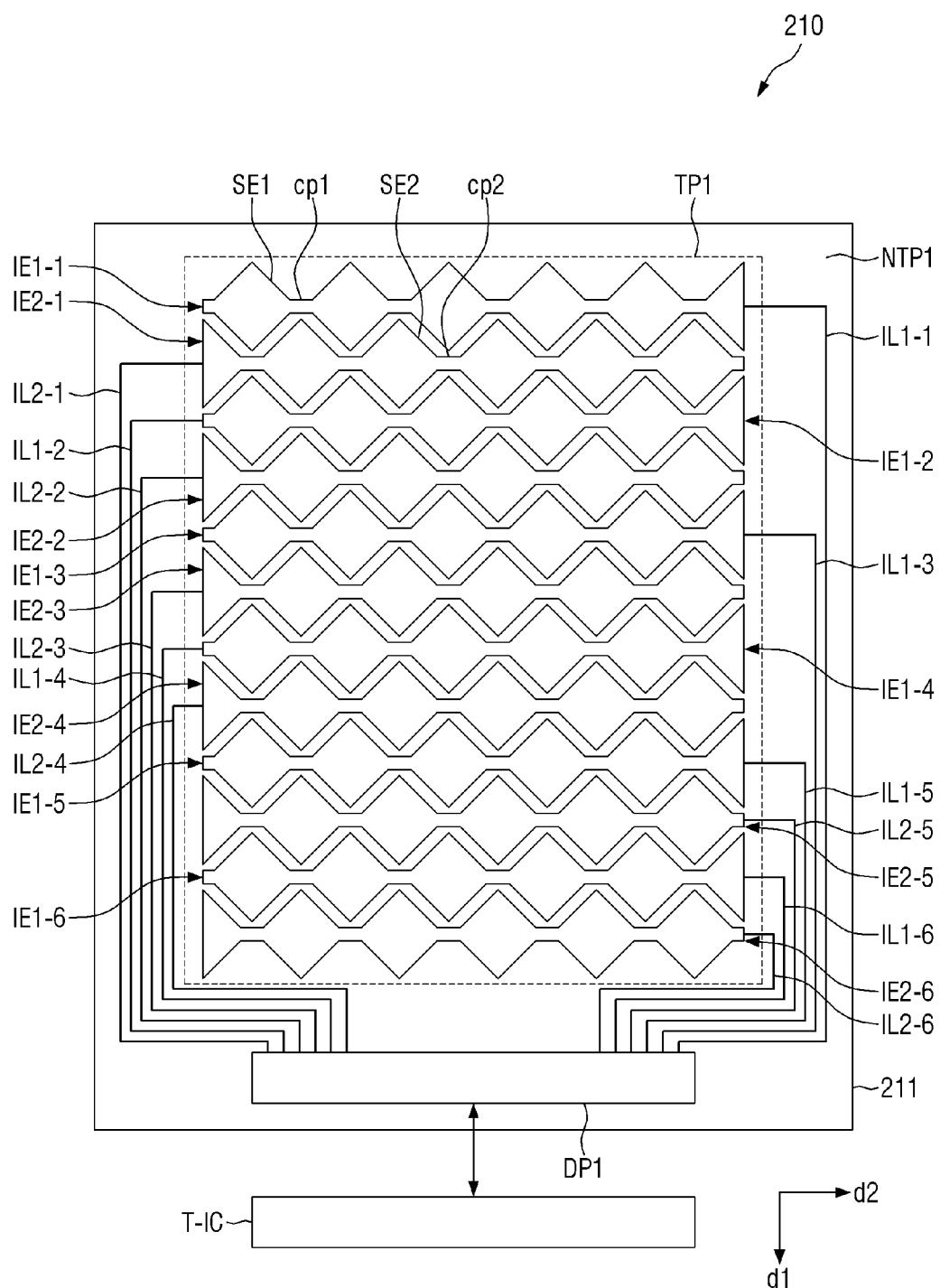
FIG. 2 is a plan view schematically illustrating a first substrate of the input sensing panel shown in FIG. 1.
Figure 3:
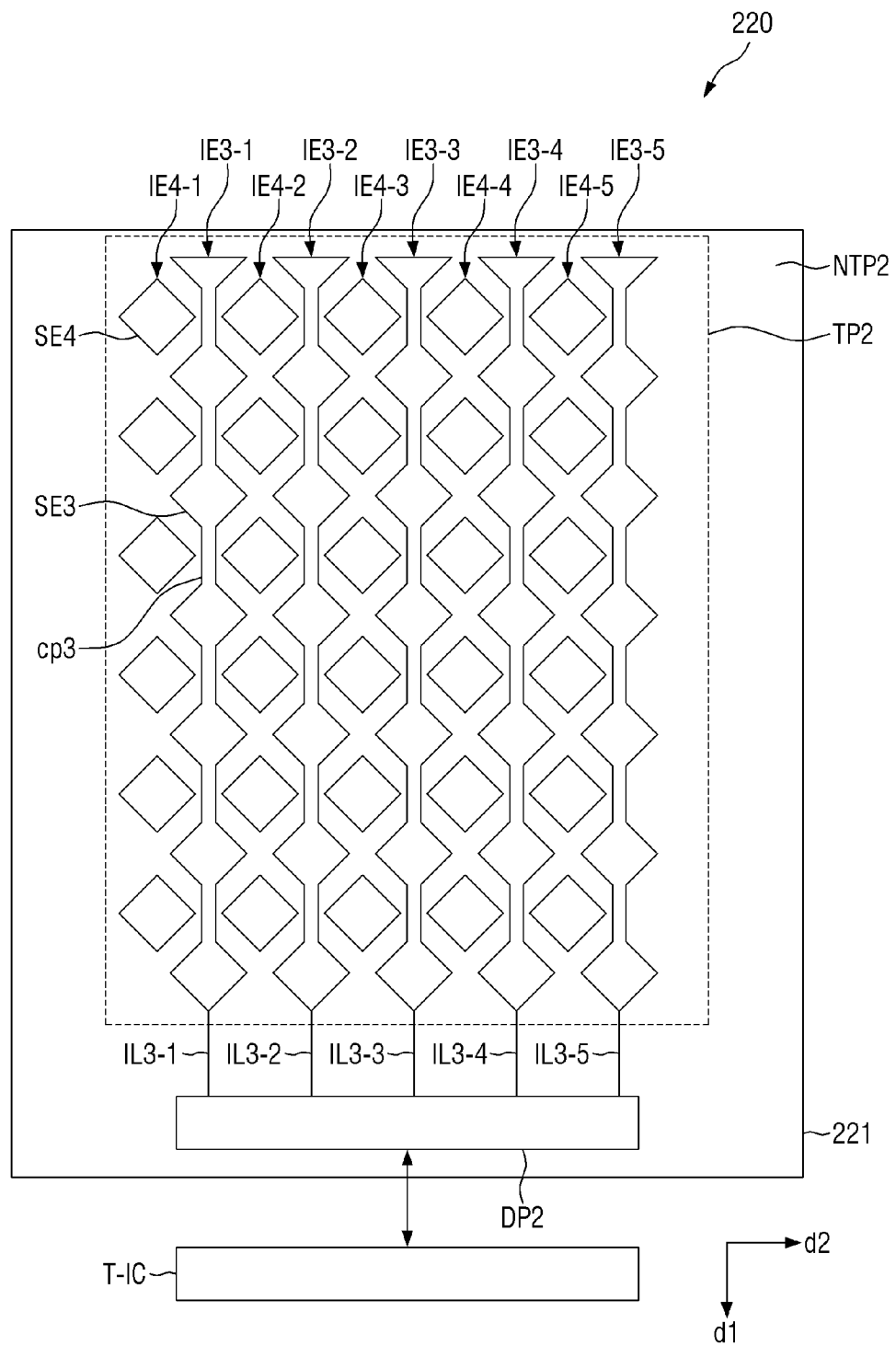
FIG. 3 is a plan view schematically illustrating a second substrate of the input sensing panel shown in FIG. 1.
Figure 4:
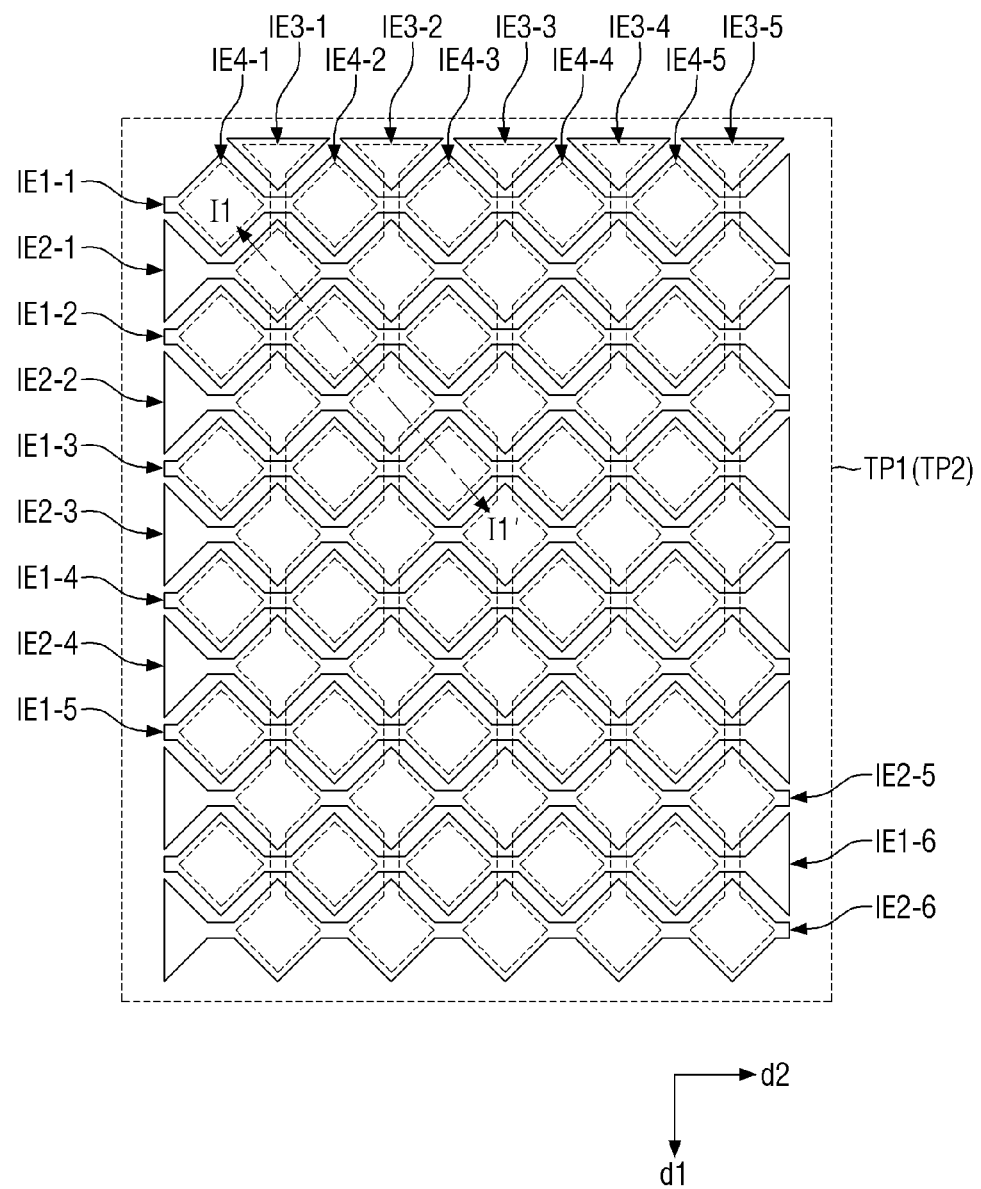
FIG. 4 is a plan view showing a touch area between the first substrate and the second substrate shown in FIGS. 2 and 3.
Figure 5A:
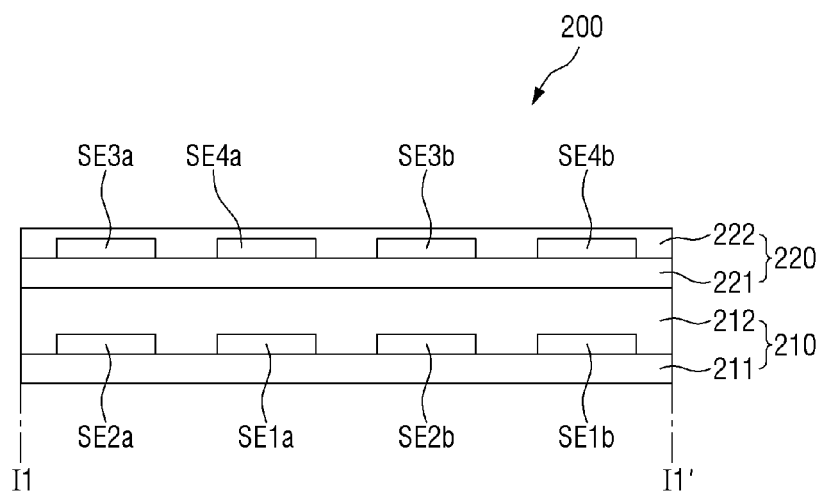
FIG. 5A is a cross-sectional view taken along line I1-I1' in FIG. 4 according to an exemplary embodiment of the present invention.

FIG. 2 is a plan view schematically illustrating a first substrate of the input sensing panel shown in FIG. 1. FIG. 3 is a plan view schematically illustrating a second substrate of the input sensing panel shown in FIG. 1. FIG. 4 is a plan view showing a touch area disposed between the first substrate and the second substrate shown in FIGS. 2 and 3. FIG. 5A is a cross-sectional view taken along line I1-I1' in FIG. 4. For convenience of explanation, although it is shown in FIG. 4 that the size of a sensing electrode provided in a second substrate 220 is smaller than the size of a sensing electrode provided in a first substrate 210, the size of a sensing electrode according to exemplary embodiments of the present invention is not limited thereto.

Referring to FIGS. 2 to 5A, in an exemplary embodiment, the input sensing panel 200 includes a first substrate 210 and a second substrate 220.

Hereinafter, the first substrate 210 will be described first with reference to FIGS. 1, 2 and 5A.

In an exemplary embodiment, the first substrate 210 is disposed on the display panel 100, and is coupled to the upper surface of the display panel 100 through the first adhesive member 510 (refer to FIG. 1). In an exemplary embodiment, the first substrate 210 includes a first base layer 211, a plurality of first sensing electrodes IE1-1 to IE1-6, a plurality of second sensing electrodes IE2-1 to IE2-6, a plurality of first signal lines IL1-1 to IL1-6, a plurality of second signal lines IL2-1 to IL2-6, a first touch pad unit DP1, and a first insulating layer 212. Reference numerals of the plurality of first sensing electrodes IE1-1 to IE1-6 and the plurality of second sensing electrodes IE2-1 to IE2-6 are expressed based on the row in which they are disposed.

The first base layer 211 provides a base surface to the plurality of first sensing electrodes IE1-1 to IE1-6, the plurality of second sensing electrodes IE2-1 to IE2-6, the plurality of first signal lines IL1-1 to IL1-6, and the plurality of second signal lines IL2-1 to IL2-6. For example, in an exemplary embodiment, the plurality of first sensing electrodes IE1-1 to IE1-6, the plurality of second sensing electrodes IE2-1 to IE2-6, the plurality of first signal lines IL1-1 to IL1-6, and the plurality of second signal lines IL2-1 to IL2-6 are formed on the same layer (e.g., the first base layer 211). In an exemplary embodiment, the first base layer 211 may be a synthetic resin film, a glass substrate, an organic/inorganic composite material substrate, etc. The base layer 211 is not limited to a single layer, and may have a form in which a plurality of layers is attached to one another through, for example, an adhesive member. In an exemplary embodiment, the input sensing panel 200 is an input sensing layer directly formed on the display panel 100, and the first base layer 211 is omitted.

In an exemplary embodiment, the first base layer 211 is divided into a first display area TP1 and a first non-display area NTP1. The first display area TP1 is defined as an area overlapping an area in which an image is displayed in the display panel 100 (refer to FIG. 1). Further, the first non-display area NTP1 is defined as an area disposed on the outer periphery of the first display area TP1 and overlapping an area in which an image is not displayed in the display panel 100. For convenience of illustration, a plurality of lines arranged in the first non-display area NTP1 is shown in the form of a 'line' in the figures.

In an exemplary embodiment, the plurality of first sensing electrodes IE1-1 to IE1-6 is arranged on the first base layer 211, and is arranged in the display area TP1 along a first direction d1. Referring to FIG. 2, in an exemplary embodiment, the first sensing electrodes IE1-1 to IE1-6 are spaced apart from one another and arranged in different rows. In an exemplary embodiment, each of the plurality of first sensing electrodes IE1-1 to IE1-6 includes a plurality of first sensing units SE1 and a plurality of first connection units cp1. In an exemplary embodiment, the first sensing units SE1 are arranged along a second direction d2 intersecting the first direction d1, and are connected to one another through the plurality of first connection units cp1. That is, the plurality of first connection units cp1 is disposed between the plurality of first sensing units SE1 to electrically and physically connect the plurality of adjacent first sensing units SE1 to each other. Referring to FIG. 2, the first direction d1 is exemplified as a column direction, and the second direction d2 is exemplified as a row direction.

In an exemplary embodiment, the plurality of first sensing electrodes IE1-1 to IE1-6 is connected to the first touch pad unit DP1 through the plurality of first signal lines IL1-1 to IL1-6, respectively. The first touch pad unit DP1 is electrically connected to a touch driving circuit through a first flexible substrate. The plurality of first sensing electrodes IE1-1 to IE1-6 may receive a driving signal from the touch driving circuit through the first touch pad unit DP1 connected to the plurality of first signal lines IL1-1 to IL1-6.

In an exemplary embodiment, the plurality of second sensing electrodes IE2-1 to IE2-6 is arranged on the first base layer 211, and is arranged in the first display area TP1 along the first direction d1. That is, the plurality of second sensing electrodes IE2-1 to IE2-6 is arranged on the same layer as the plurality of first sensing electrodes IE1-1 to IE1-6, and are insulated from each other. In an exemplary embodiment, the plurality of first sensing electrodes IE1-1 to IE1-6 and the plurality of second sensing electrodes IE2-1 to IE2-6 are staggered along the first direction d1. For example, in an exemplary embodiment, the plurality of first sensing electrodes IE1-1 to IE1-6 and the plurality of second sensing electrodes IE2-1 to IE2-6 are arranged in different rows from each other.

In an exemplary embodiment, each of the plurality of second sensing electrodes IE2-1 to IE2-6 includes a plurality of second sensing units SE2 and a plurality of second connection units cp2. In an exemplary embodiment, the second sensing units SE2 are arranged along the second direction d2, and are connected to each other through the plurality of second connection units cp2. For example, the plurality of second connection units cp2 is disposed between the plurality of second sensing units SE2 to electrically and physically connect the plurality of adjacent second sensing units SE2 to each other.

In an exemplary embodiment, the plurality of second sensing electrodes IE2-1 to IE2-6 is connected to the first touch pad unit DP1 through the plurality of second signal lines IL2-1 to IL2-6, respectively. The first touch pad unit DP1 is electrically connected to a touch driving circuit through a first flexible substrate. The plurality of second sensing electrodes IE2-1 to IE2-6 may receive a driving signal from the touch driving circuit through the first touch pad unit DP1 connected to the plurality of second signal lines IL2-1 to IL2-6.

In an exemplary embodiment, each of the plurality of first sensing units SE1 and the plurality of second sensing units SE2 has, for example, a rhombic shape. According to exemplary embodiments, the rhombic shape includes not only a substantially rhombic shape, but also a polygonal shape close to a rhombus in consideration of, for example, process conditions. However, the present invention is not limited thereto. For example, according to exemplary embodiments, each of the plurality of first sensing units SE1 and the plurality of second sensing units SE2 may have, for example, a polygonal shape, or may have, for example, a shape without distinction between a sensor unit and a connection unit (for example, a bar shape).

In an exemplary embodiment, the plurality of first sensing electrodes IE1-1 to IE1-6 and the plurality of second sensing electrodes IE2-1 to IE2-6 may be formed of a transparent or translucent conductive material. The transparent or translucent conductive material may include at least one of, for example, indium tin oxide (ITO), indium zinc oxide (IZO), zinc oxide (ZnO), indium oxide ($In_2O_3$), indium gallium oxide (IGO), and aluminum zinc oxide (AZO).

In an exemplary embodiment, the plurality of first signal lines IL1-1 to IL1-6 and the plurality of second signal lines IL2-1 to IL2-6 are arranged in the first non-display area NTP1. In an exemplary embodiment, one end of each of the plurality of first signal lines IL1-1 to IL1-6 is connected to one end or the other end of the plurality of first sensing electrodes IE1-1 to IE1-6. In an exemplary embodiment, the other end of each of the plurality of first signal lines IL1-1 to IL1-6 is connected to a plurality of pad portions disposed on the first touch pad unit DP1. In an exemplary embodiment, one end of each of the plurality of second signal lines IL2-1 to IL2-6 is connected to one end or the other end of the plurality of second sensing electrodes IE2-1 to IE2-6. In an exemplary embodiment, the other end of each of the plurality of second signal lines IL2-1 to IL2-6 is connected to a plurality of pad portions disposed on the first touch pad unit DP1.

Unlike the exemplary embodiment shown in FIG. 2, in an exemplary embodiment, all of the plurality of first signal lines IL1-1 to IL1-6 and the plurality of second signal lines IL2-1 to IL2-6 may also be arranged on the same side surface in the first non-display area NTP1. Further, at least one of the plurality of first sensing electrodes IE1-1 to IE1-6 and the plurality of second sensing electrodes IE2-1 to IE2-6 is connected to the plurality of signal lines at both ends thereof to receive driving signals from the first touch pad unit DP1. In this case, sensing sensitivity may be prevented from being decreased due to a voltage drop of the driving signals provided through the first touch pad unit DP1.

In an exemplary embodiment, each of the plurality of first signal lines IL1-1 to IL1-6 and the plurality of second signal lines IL2-1 to IL2-6 may be formed of a single-layer film made of one conductive metal selected from aluminum (Al), copper (Cu), molybdenum (Mo), chromium (Cr), titanium (Ti), tungsten (W), molybdenum tungsten (MoW), titanium molybdenum (MoTi), and copper/titanium molybdenum (Cu/MoTi), a double-layer film made of two conductive metals selected therefrom, or a triple-layer film made of three conductive metals selected therefrom. However, the present invention is not limited thereto, and the plurality of first signal lines IL1-1 to IL1-6 and the plurality of second signal lines IL2-1 to IL2-6 may be made of various metals or conductors.

In an exemplary embodiment, the plurality of first sensing electrodes IE1-1 to IE1-6 and the plurality of second sensing electrodes IE2-1 to IE2-6 are arranged on different layers from the plurality of first signal lines IL1-1 to IL1-6 and the plurality of second signal lines IL2-1 to IL2-6. Thus, contact holes for electrically connecting two conductors disposed on different layers and connection electrodes may be additionally provided. In an exemplary embodiment, the plurality of first signal lines IL1-1 to IL1-6 and the plurality of second signal lines IL2-1 to IL2-6 may be replaced by, for example, circuit boards that are separately formed and coupled.

The first touch pad unit DP1 may be electrically connected to the touch driving circuit through a separate first flexible substrate. Thus, the plurality of first sensing electrodes IE1-1 to IE1-6 may receive a driving signal from the touch driving circuit through the plurality of first signal lines IL1-1 to IL1-6 and the first touch pad unit DP1, and the plurality of second sensing electrodes IE2-1 to IE2-6 may receive a driving signal from the touch driving circuit through the plurality of second signal lines IL2-1 to IL2-6 and the first touch pad unit DP1.

In an exemplary embodiment, the first insulating layer 212 is disposed on the plurality of first sensing electrodes IE1-1 to IE1-6, the plurality of second sensing electrodes IE2-1 to IE2-6, the plurality of first signal lines IL1-1 to IL1-6, and the plurality of second signal lines IL2-1 to IL2-6. In an exemplary embodiment, the first insulating layer 212 may be a single-layer structure or a multi-layer structure. The first insulating layer 212 may be formed of a material having a high dielectric constant while having an elastic force. In an exemplary embodiment, the first insulating layer 212 may be formed of, for example, acrylic, polyurethane, or polydimethylsiloxane (PDMS).

In an exemplary embodiment, the first insulating layer 212 may be formed of another material having a high dielectric constant while having an elastic force. Further, the first insulating layer 212 may be formed of a material having adhesiveness. In this case, the first substrate 210 and the second substrate 220 may be coupled to each other through the first insulating layer 212. In an exemplary embodiment, a separate adhesive layer may be formed between the first substrate 210 and the second substrate 220.

Next, the second substrate 220 will be described with reference to FIGS. 1, 3 and 5A.

In an exemplary embodiment, the second substrate 220 includes a second base layer 221, a plurality of third sensing electrodes IE3-1 to IE3-5, a plurality of fourth sensing electrodes IE4-1 to IE4-5, a plurality of third signal lines IL3-1 to IL3-5, a second touch pad unit DP2, and a second insulating layer 222. Reference numerals of the plurality of third sensing electrodes IE3-1 to IE3-5 and the plurality of fourth sensing electrodes IE4-1 to IE4-5 are expressed based on the column to be disposed.

The second base layer 221 provides a base surface to the plurality of third sensing electrodes IE3-1 to IE3-5, the plurality of fourth sensing electrodes IE4-1 to IE4-5, and the plurality of third signal lines IL3-1 to IL3-5. In an exemplary embodiment, the second base layer 221 may be formed of the same material as that of the first base layer 211. In an exemplary embodiment, the second base layer 221 is disposed on the first insulating layer 212. As described above, in an exemplary embodiment, when the first insulating layer 212 has an adhesive component, the second base layer 221 may be directly coupled to the first insulating layer 212. In an exemplary embodiment, when there is a separate adhesive layer disposed between the second base layer 221 and the first insulating layer 212, the second base layer 221 may be disposed on the separate adhesive layer.

In an exemplary embodiment, the second base layer 221 is divided into a second display area TP2 and a second non-display area NTP2. The second display area TP2 overlaps the above-described first display area TP1, and also overlaps a display area in which an image is displayed by the display panel 100. The second non-display area NTP2 is defined as an area disposed on the outer periphery of the second display area TP2 and overlapping an area in which an image is not displayed in the display panel 100. The area of the second display area TP2 may be the same as or different from the area of the first display area TP1.

In an exemplary embodiment, the plurality of third sensing electrodes IE3-1 to IE3-5 is arranged on the second base layer 221 along the second direction d2. For example, in an exemplary embodiment, the plurality of third sensing electrodes IE3-1 to IE 3-5 is arranged in different columns. In an exemplary embodiment, each of the plurality of third sensing electrodes IE3-1 to IE3-5 includes a plurality of third sensing units SE3 and a plurality of third connection units cp3. The third sensing units SE3 are arranged along the first direction d1, and are connected to one another through the plurality of third connection units cp3. For example, the plurality of third connection units cp3 is disposed between the plurality of third sensing units SE3 to electrically and physically connect the plurality of adjacent third sensing units SE3 to each other.

In an exemplary embodiment, the plurality of third sensing electrodes IE3-1 to IE3-5 is connected to the second touch pad unit DP2 through the plurality of third signal lines IL3-1 to IL3-5, respectively. In an exemplary embodiment, the second touch pad unit DP2 includes a plurality of pad units arranged along the second direction d2. The plurality of pad units may be connected to the plurality of third signal lines IL3-1 to IL3-5, respectively. The second touch pad unit DP2 may receive a driving signal from a touch driving circuit through a second flexible substrate. For example, the plurality of third sensing electrodes IE3-1 to IE3-5 may receive a driving signal from the touch driving circuit through the third signal lines IL3-1 to IL3-5 and the second touch pad unit DP2.

In an exemplary embodiment, the plurality of fourth sensing electrodes IE4-1 to IE4-5 is arranged on the second base layer 221 along the first direction d1. The plurality of fourth sensing electrodes IE4-1 to IE4-5 is insulated from the plurality of third sensing electrodes IE3-1 to IE3-5. In an exemplary embodiment, the plurality of fourth sensing electrodes IE4-1 to IE4-5 includes a plurality of fourth sensing units SE4, respectively. However, the plurality of fourth sensing electrodes IE4-1 to IE4-5 does not include connection units for connecting the sensing units SE4 to each other. For example, each of the plurality of fourth sensing units SE4 has an island shape in which the plurality of fourth sensing units SE4 are not connected to one another. Accordingly, at least one of the plurality of fourth sensing units SE4 may be in a floating state, and, in some exemplary embodiments, all of the plurality of fourth sensing units may be in a floating state.

In an exemplary embodiment, each of the plurality of third sensing units SE3 and the plurality of fourth sensing units SE4 has a rhombic shape. According to exemplary embodiments, the rhombic shape includes not only a substantially rhombic shape, but also a polygonal shape close to a rhombus in consideration of, for example, process conditions. However, the present invention is not limited thereto. For example, according to exemplary embodiments, the first to fourth sensing units SE1 to SE4 may be different from one another in shape, and may also be different from one another in size.

In an exemplary embodiment, the plurality of third sensing electrodes IE3-1 to IE3-5 and the plurality of fourth sensing electrodes IE4-1 to IE4-5 may be formed of a transparent or translucent conductive material. The transparent or translucent conductive material may include at least one of, for example, indium tin oxide (ITO), indium zinc oxide (IZO), zinc oxide (ZnO), indium oxide ($In_2O_3$), indium gallium oxide (IGO), and aluminum zinc oxide (AZO).

In an exemplary embodiment, the plurality of third signal lines IL3-1 to IL3-5 is arranged in the second non-display area NTP2. One end of each of the third signal lines IL3-1 to IL3-5 may be connected to one end or the other end of the plurality of third sensing electrodes IE3-1 to IE3-5. The other end of each of the plurality of third signal lines IL3-1 to IL3-5 may be connected to a plurality of pad portions disposed on the second touch pad unit DP2. Unlike the exemplary embodiment shown in FIG. 3, in an exemplary embodiment, one end and the other end of the plurality of third sensing electrodes IE3-1 to IE3-5 are connected to the plurality of signal lines to receive driving signals.

In an exemplary embodiment, each of the plurality of third signal lines IL3-1 to IL3-5 may be formed of a single-layer film made of one conductive metal selected from, for example, aluminum (Al), copper (Cu), molybdenum (Mo), chromium (Cr), titanium (Ti), tungsten (W), molybdenum tungsten (MoW), titanium molybdenum (MoTi), and copper/titanium molybdenum (Cu/MoTi), a double-layer film made of two conductive metals selected therefrom, or a triple-layer film made of three conductive metals selected therefrom. However, the present invention is not limited thereto, and the plurality of third signal lines IL3-1 to IL3-5 may be made of various metals or conductors.

In an exemplary embodiment, the plurality of third sensing electrodes IE3-1 to IE3-5 and the plurality of fourth sensing electrodes IE4-1 to IE4-5 are arranged on different layers from the plurality of third signal lines IL3-1 to IL3-5. Thus, according to exemplary embodiments, contact holes for electrically connecting two conductors disposed on different layers and connection electrodes may be additionally provided. In an exemplary embodiment, the plurality of third signal lines IL3-1 to IL3-5 may be replaced by, for example, circuit boards that are separately formed and coupled.

The second touch pad unit DP2 may be electrically connected to the touch driving circuit through a separate second flexible substrate. Thus, the plurality of third sensing electrodes IE3-1 to IE3-5 may receive a driving signal from the touch driving circuit through the plurality of second signal lines IL2-1 to IL2-6 and the first touch pad unit DP1.

In an exemplary embodiment, the second insulating layer 222 is disposed on the plurality of third sensing electrodes IE3-1 to IE3-5, the plurality of fourth sensing electrodes IE4-1 to IE4-5, and the plurality of third signal lines IL3-1 to IL3-5. The second insulating layer 222 may be, for example, a single-layer structure or a multi-layer structure. In an exemplary embodiment, the second insulating layer 222 may be formed of, for example, an inorganic material, an organic material, or a composite material. In an exemplary embodiment, the second adhesive member 520 is disposed on the second insulating layer 222. In an exemplary embodiment, the second insulating layer 222 is formed of the same material as the first insulating layer 212. In an exemplary embodiment, the second adhesive member 520 may be omitted. For example, in an exemplary embodiment in which the second insulating layer 222 includes an adhesive material, the second adhesive member 520 may be omitted.

Next, an overlapping relationship between the sensing electrodes will be described. Herein, the term "overlapping" may mean that two components overlap each other in the vertical direction.

In an exemplary embodiment, the plurality of third sensing electrodes IE3-1 to IE3-5 overlaps the plurality of second sensing electrodes IE2-1 to IE2-6, and the plurality of fourth sensing electrodes IE4-1 to IE4-5 overlaps the plurality of first sensing electrodes IE1-1 to IE1-6.

Herein, an example will be described with reference to FIG. 5A. The first sensing unit SE1a and the first sensing unit SE1b illustrate two sensing units adjacent to each other from among the plurality of first sensing electrodes IE1-1 to IE1-6. The second sensing unit SE2a and the second sensing unit SE2b illustrate two sensing units adjacent to each other from among the plurality of second sensing electrodes IE2-1 to IE2-6. Further, the third sensing unit SE3a and the third sensing unit SE3b illustrate two sensing units adjacent to each other from among the plurality of third sensing electrodes IE3-1 to IE3-5, and the fourth sensing unit SE4a and the fourth sensing unit SE4b illustrate two adjacent sensing units from among the plurality of fourth sensing electrodes IE4-1 to IE4-5.

The first sensing unit SE1a and the first sensing unit SE1b overlap the fourth sensing unit SE4a and the fourth sensing unit SE4b, respectively. Further, the second sensing unit SE2a and the second sensing units SE2b overlap the third sensing unit SE3a and the third sensing unit SE3b, respectively.

According to exemplary embodiments, the size of each sensing unit is not particularly limited. For example, in an exemplary embodiment, the sizes of the third sensing unit SE3a, the third sensing unit SE3b, the fourth sensing unit SE4a, and the fourth sensing unit SE4b are larger than the sizes of the first sensing unit SE1a, the first sensing unit SE1b, the second sensing unit SE2a, and the second sensing unit SE2b. Thus, according to exemplary embodiments, the sizes of the sensing units located at relatively upper positions may be increased to secure a predetermined tolerance. Accordingly, the misalignment that may occur when the first substrate 210 and the second substrate 220 are attached together may be reduced.

It is to be understood that the arrangement relationship of each sensing electrode and each signal line is not limited to that shown in FIG. 5A, as described below with reference to FIGS. 5B to 5D.

Figure 5B:
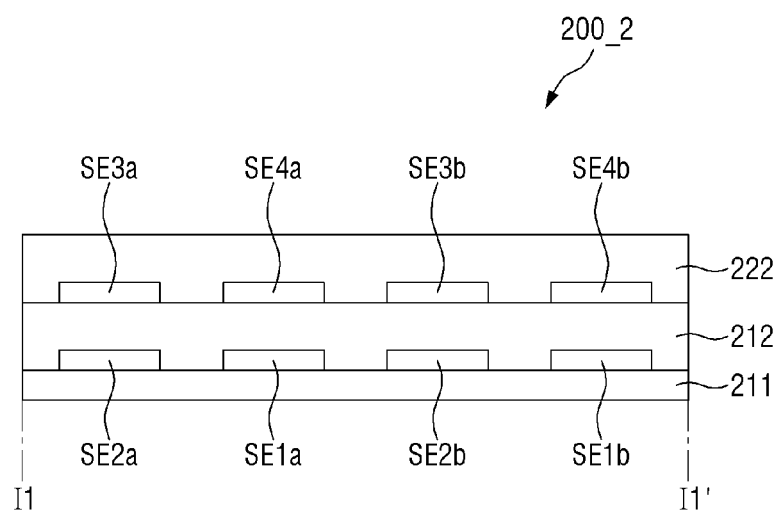
FIGS. 5B to 5D are cross-sectional views showing different arrangement relationships of the sensing electrodes and signal lines shown in FIG. 5A according to exemplary embodiments of the present invention.
Figure 5C:
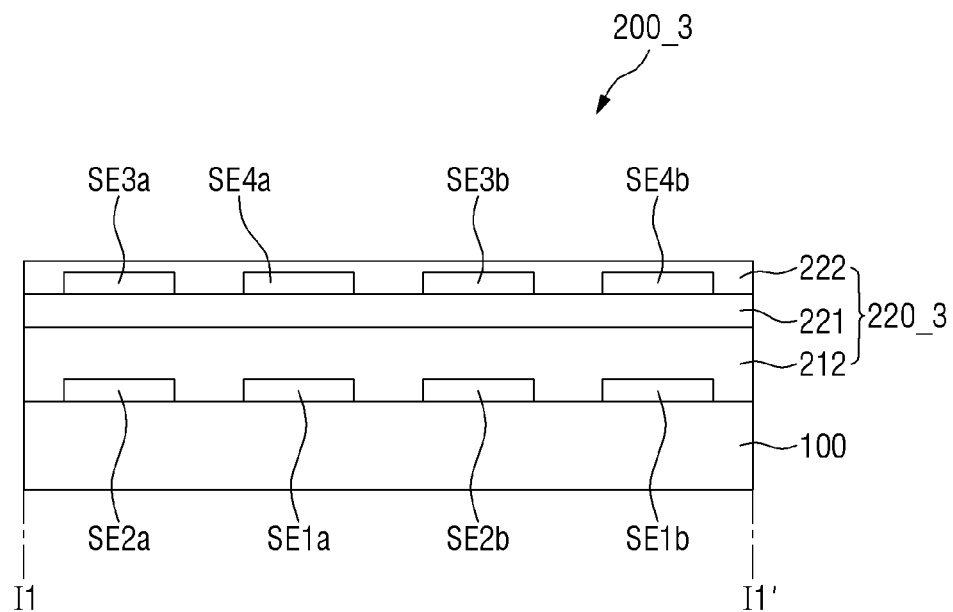
Figure 5D:
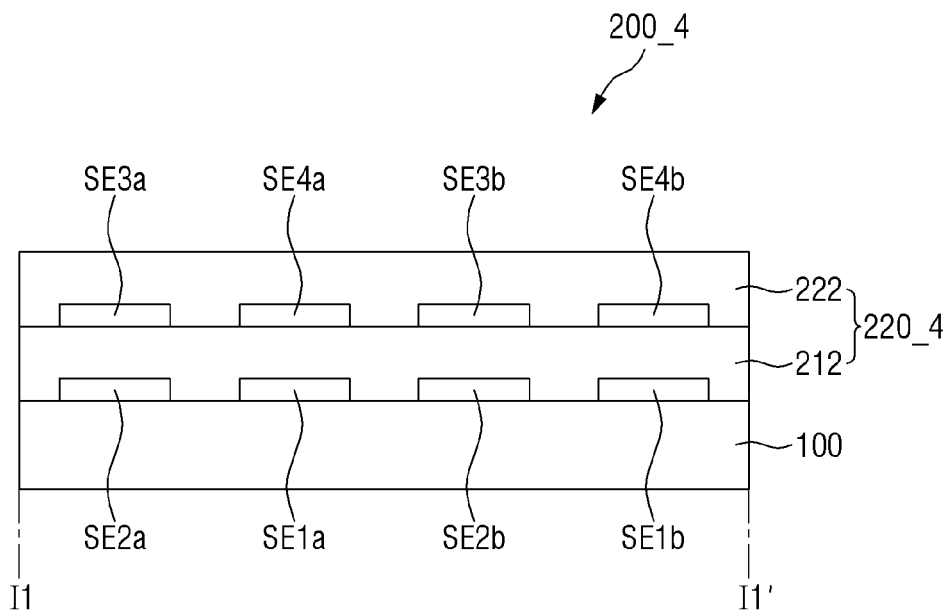

FIGS. 5B to 5D are cross-sectional views showing different arrangement relationships of the sensing electrodes and signal lines shown in FIG. 5A according to exemplary embodiments of the present invention. For convenience of explanation, a further description of elements previously described with reference to FIG. 5A may be omitted.

Referring to FIG. 5B, in an exemplary embodiment, an input sensing panel 200_2 does not include the second base layer 221 as compared with the input sensing panel 200 shown in FIG. 5A. Accordingly, the plurality of third sensing electrodes IE3-1 to IE3-5, the plurality of fourth sensing electrodes IE4-1 to IE4-5, and the plurality of third signal lines IL3-1 to IL3-5 may be formed directly on the insulating layer 212.

Referring to FIG. 5C, in an exemplary embodiment, an input sensing panel 200_3 does not include the first base layer 211 as compared with the input sensing panel 200 shown in FIG. 5A. Accordingly, the plurality of first sensing electrodes IE1-1 to IE1-6, the plurality of second sensing electrodes IE2-1 to IE2-6, the plurality of first signal lines IL1-1 to IL1-6, and the plurality of second signal lines IL2-1 to IL2-6 may be formed directly on the upper surface of the display panel 100 (refer to FIG. 1). In this case, the first adhesive member 510 having been described with reference to FIG. 1 may be omitted. In FIG. 5C, a second substrate 220_3 includes the first insulating layer 212, the second base layer 221, and the second insulating layer 222.

Referring to FIG. 5D, in an exemplary embodiment, an input sensing panel 200_4 does not include the first base layer 211 as compared with the input sensing panel 200 shown in FIG. 5A. Accordingly, the plurality of first sensing electrodes IE1-1 to IE1-6, the plurality of second sensing electrodes IE2-1 to IE2-6, the plurality of first signal lines IL1-1 to IL1-6, and the plurality of second signal lines IL2-1 to IL2-6 may be formed directly on the upper surface of the display panel 100 (refer to FIG. 1). In FIG. 5D, a second substrate 220_4 includes the first insulating layer 212 and the second insulating layer 222.

Hereinafter, a method of sensing a touch position and a touch pressure in a display device according to an exemplary embodiment of the present invention will be described with reference to FIGS. 6 to 8.

First, a method of sensing a touch position will be described with reference to FIG. 6.

Figure 6:
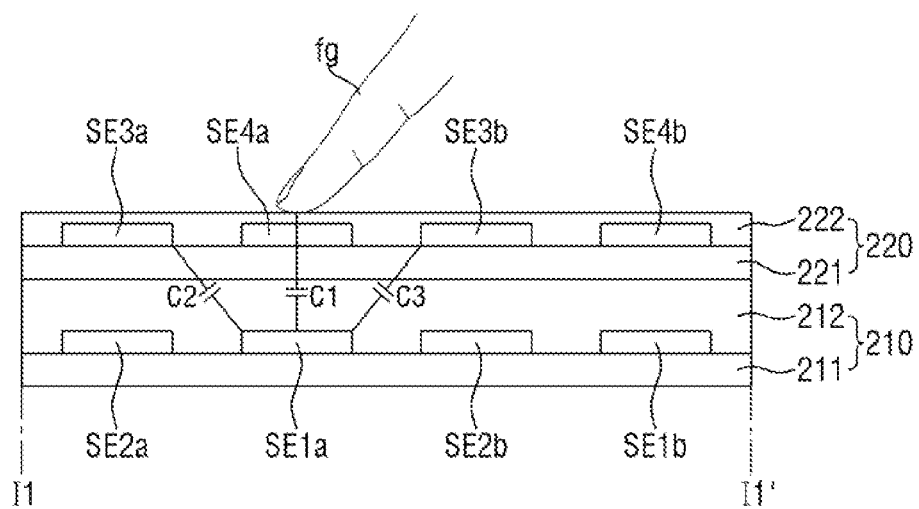
FIG. 6 is a cross-sectional view for describing a method of sensing a touch position in a display device according to an exemplary embodiment of the present invention.

FIG. 6 is a cross-sectional view for describing a method of sensing a touch position in a display device according to an exemplary embodiment of the present invention. For convenience of explanation, in FIG. 6, the method will be described with reference to a cross-section taken along line I1-I1' shown in FIG. 4.

The plurality of first sensing electrodes IE1-1 to IE1-6 may operate as sensing electrodes Rx when sensing a touch position of, for example, a user's finger fg, and the plurality of third sensing electrodes IE3-1 to IE3-5 may operate as driving electrodes Tx when sensing the touch position. Instead of a user's finger fg, the sensing electrodes Rx may also sense a touch position of, for example, a touch pen. Referring to FIG. 6, when sensing the touch position, the first sensing unit SE1a and the first sensing unit SE1b may operate as sensing electrodes, and the third sensing unit SE3a and the third sensing unit SE3b may operate as driving electrodes.

Further, the plurality of fourth sensing electrodes IE4-1 to IE4-5 may operate as floating electrodes when sensing the touch position. However, the plurality of second sensing electrodes IE2-1 to IE2-6 is not utilized for sensing the touch position. That is, when sensing the touch position, the fourth sensing unit SE4a and the fourth sensing unit SE4b operate as floating electrodes, whereas the second sensing unit SE2a and the second sensing unit SE2b are not utilized for sensing the touch position. The plurality of second sensing electrodes IE2-1 to IE2-6 including the second sensing unit SE2a and the second sensing unit SE2b operate as dummy electrodes which are not utilized for sensing the touch position. That is, the plurality of second sensing electrodes IE2-1 to IE2-6 may be in a floating state in which driving signals are not provided at the time of sensing the touch position.

An example will be described herein. In an exemplary embodiment, a first capacitor C1 is formed between the first sensing unit SE1a operating as a sensing electrode and the fourth sensing unit SE4a operating as a floating electrode. Further, a second capacitor C2 is formed between the first sensing unit SE1a and the third sensing unit SE3a, and a third capacitor C3 is formed between the first sensing unit SE1a and the third sensing unit SE3b.

The capacitances of the first to third capacitors C1 to C3 may be changed according to a touch by a conductive object such as, for example, a touch by a user's finger fg or a capacitive touch pen. For example, the distance between the third sensing unit SE3a and the fourth sensing unit SE4a and the distance between the fourth sensing unit SE4a and the first sensing unit SE1a may be changed by the touch of a user's finger fg. The capacitances of the first to third capacitors C1 to C3 are changed by the distance change. The display device according to an exemplary embodiment of the present invention may sense the position of the user's touch by detecting the capacitance change amount.

The plurality of second sensing electrodes IE2-1 to IE2-6 overlap the plurality of third sensing electrodes IE3-1 to IE3-5, and the plurality of fourth sensing electrodes IE4-1 to IE4-5 overlap the plurality of first sensing electrodes IE1-1 to IE1-6. Accordingly, when sensing the touch position, the plurality of second sensing electrodes IE2-1 to IE2-6 and the plurality of fourth sensing electrodes IE4-1 to IE4-5 can prevent the pattern shapes of the plurality of first sensing electrodes IE1-1 to IE1-6 and the plurality of third sensing electrodes IE3-1 to IE3-5 from being visually recognized.

Next, a method of sensing a touch position will be described with reference to FIGS. 3 and 7. Herein, a process in which touch pressure sensing is performed may be referred to as a touch pressure sensing operation, and a process in which touch position sensing is performed may be referred to as a touch position sensing operation.

Figure 7:
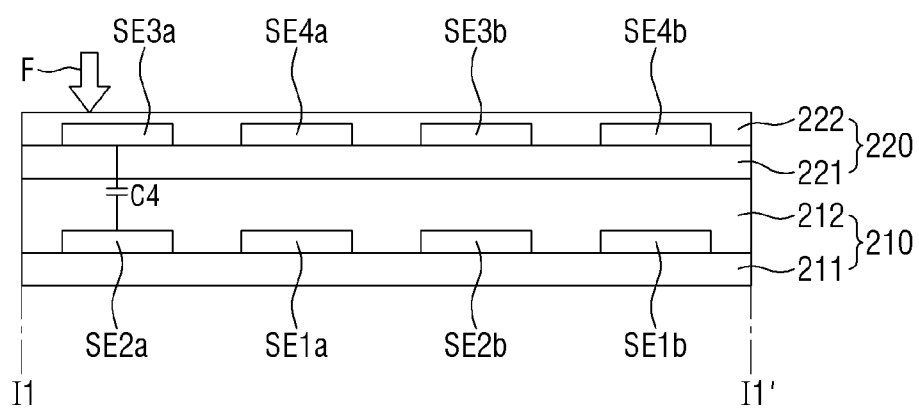
FIG. 7 is a view for describing a method of sensing a touch pressure in a display device according to an exemplary embodiment of the present invention.

FIG. 7 is a view for describing a method of sensing a touch pressure in a display device according to an exemplary embodiment of the present invention.

The display device according to an exemplary embodiment of the present invention can measure the user's touch pressure F through a resistance sensing method, as described in more detail below.

The plurality of second sensing electrodes IE2-1 to IE2-6 and the plurality of third sensing electrodes IE3-1 to IE3-5 may operate as pressure electrodes at the time of detecting the user's touch pressure F. For example, a driving signal for detecting a touch pressure may be transmitted to the plurality of second sensing electrodes IE2-1 to IE2-6, and a constant voltage, for example, a ground (GND) voltage, may be applied to the plurality of third sensing electrodes IE3-1 to IE3-5.

Accordingly, in an exemplary embodiment, a fourth capacitor C4 is formed between the plurality of second sensing electrodes IE2-1 to IE2-6 and the plurality of third sensing electrodes IE3-1 to IE3-5. The capacitance of the fourth capacitor C4 is changed when the user's touch pressure F is applied. For example, the display device according to an exemplary embodiment detects the user's touch pressure F by measuring the change in the capacitance of the fourth capacitor C4. The user's touch pressure F may be applied by, for example, the user's finger fg or a touch pen.

The plurality of first sensing electrodes IE1-1 to IE1-6 and the plurality of fourth sensing electrodes IE4-1 to IE4-5 are not utilized for detecting the user's touch pressure F. That is, the plurality of first sensing electrodes IE1-1 to IE1-6 and the plurality of fourth sensing electrodes IE4-1 to IE4-5 operate as dummy electrodes which are not utilized for sensing the touch pressure.

Next, timing of sensing a touch position and a touch pressure will be described with reference to FIG. 8.

Figure 8:
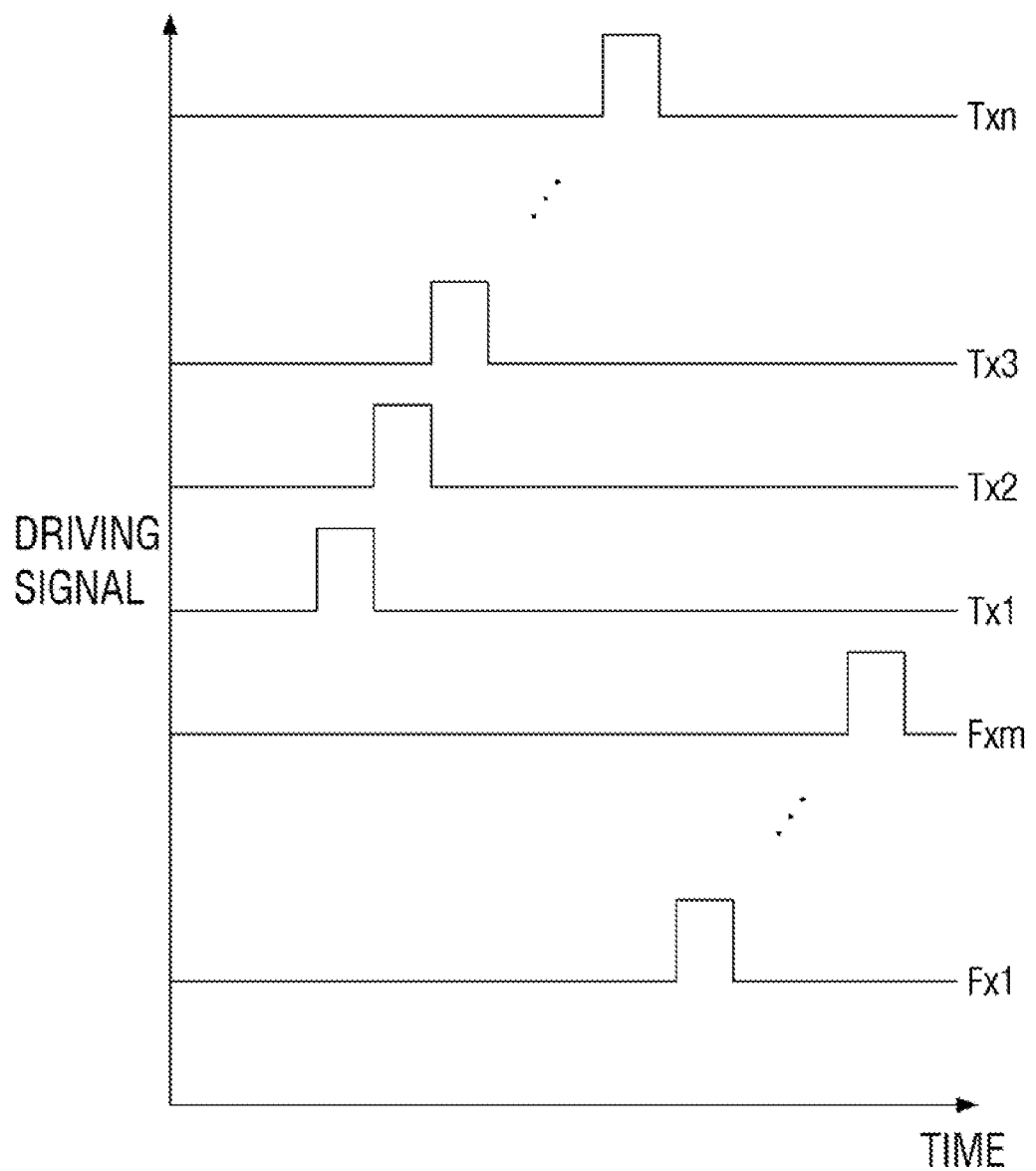
FIG. 8 is a view for describing a timing of sensing a touch position and a touch pressure according to an exemplary embodiment of the present invention.

FIG. 8 is a view for describing a timing of sensing a touch position and a touch pressure according to an exemplary embodiment of the present invention. For convenience of explanation, driving signals for touch position sensing are referred to as Tx1 to Txn (n is a natural number equal to 2 or more), and driving signals for touch pressure sensing are referred to as Fx1 to Fxm (m is a natural number equal to 2 or more).

Referring to FIG. 8, in an exemplary embodiment, the driving signals Tx1 to Txn for touch position sensing may be provided to the plurality of third sensing electrodes IE3-1 to IE3-5 operating as driving electrodes Tx at the time of sensing a touch position. Further, the driving signals Fx1 to Fxm for touch pressure sensing may be provided to the plurality of second sensing electrodes IE2-1 to IE2-6 at the time of sensing a touch pressure. As described above, a ground voltage may be provided to the plurality of third sensing electrodes IE3-1 to IE3-5 at the time of sensing a touch pressure.

That is, in an exemplary embodiment, the driving signals Tx1 to Txn for touch position sensing are temporally spaced from the driving signals Fx1 to Fxm for touch pressure sensing. In an exemplary embodiment, first, the driving signals Tx1 to Txn for touch position sensing are provided, and then the driving signals Fx1 to Fxm for touch pressure sensing are provided. That is, the driving signals Tx1 to Txn for touch position sensing and the driving signals Fx1 to Fxm for touch pressure sensing are temporally spaced from each other, thereby minimizing mutual noises, and preventing the deterioration of sensing sensitivity. Since the accuracy of the touch position sensing is typically of higher importance than the accuracy of the touch pressure sensing, the driving frequencies of the driving signals Fx1 to Fxm for touch pressure sensing may be lower than the driving frequencies of the driving signals Tx1 to Txn for touch position sensing. Accordingly, the load of a touch driving circuit for providing the driving signals can be reduced.

In an exemplary embodiment, the driving signals Tx1 to Txn for touch position sensing and the driving signals Fx1 to Fxm for touch pressure sensing may be provided from different touch pads from each other. For example, the driving signals Tx1 to Txn for touch position sensing may be provided to the plurality of third sensing electrodes IE3-1 to IE3-5 through the second touch pad unit DP2, and the driving signals Fx1 to Fxm for touch pressure sensing may be provided to the plurality of second sensing electrodes IE2-1 to IE2-6 through the first touch pad unit DP1.

Unlike the exemplary embodiment shown in FIG. 8, in an exemplary embodiment, the drive signals Fx1 to Fxm for touch pressure sensing may be provided, and then the drive signals Tx1 to Txn for touch position sensing may be subsequently provided. Alternatively, in an exemplary embodiment, the driving signals Tx1 to Txn for touch position sensing and the driving signals Fx1 to Fxm for touch pressure sensing may at least partially overlap each other.

That is, the display device according to an exemplary embodiment of the present invention may detect both the user's touch position and touch pressure through the input sensing panel 200. Accordingly, in exemplary embodiments, the display device does not include a separate, dedicated sensor module for detecting a touch pressure. Thus, the thickness of the input sensing panel 200 and the entire thickness of the display device including the input sensing panel 200 can be reduced according to exemplary embodiments of the present invention.

Hereinafter, a display device according to an exemplary embodiment of the present invention will be described. For convenience of explanation, a further description of elements previously described with reference to FIGS. 1 to 8 may be omitted.

Figure 9:
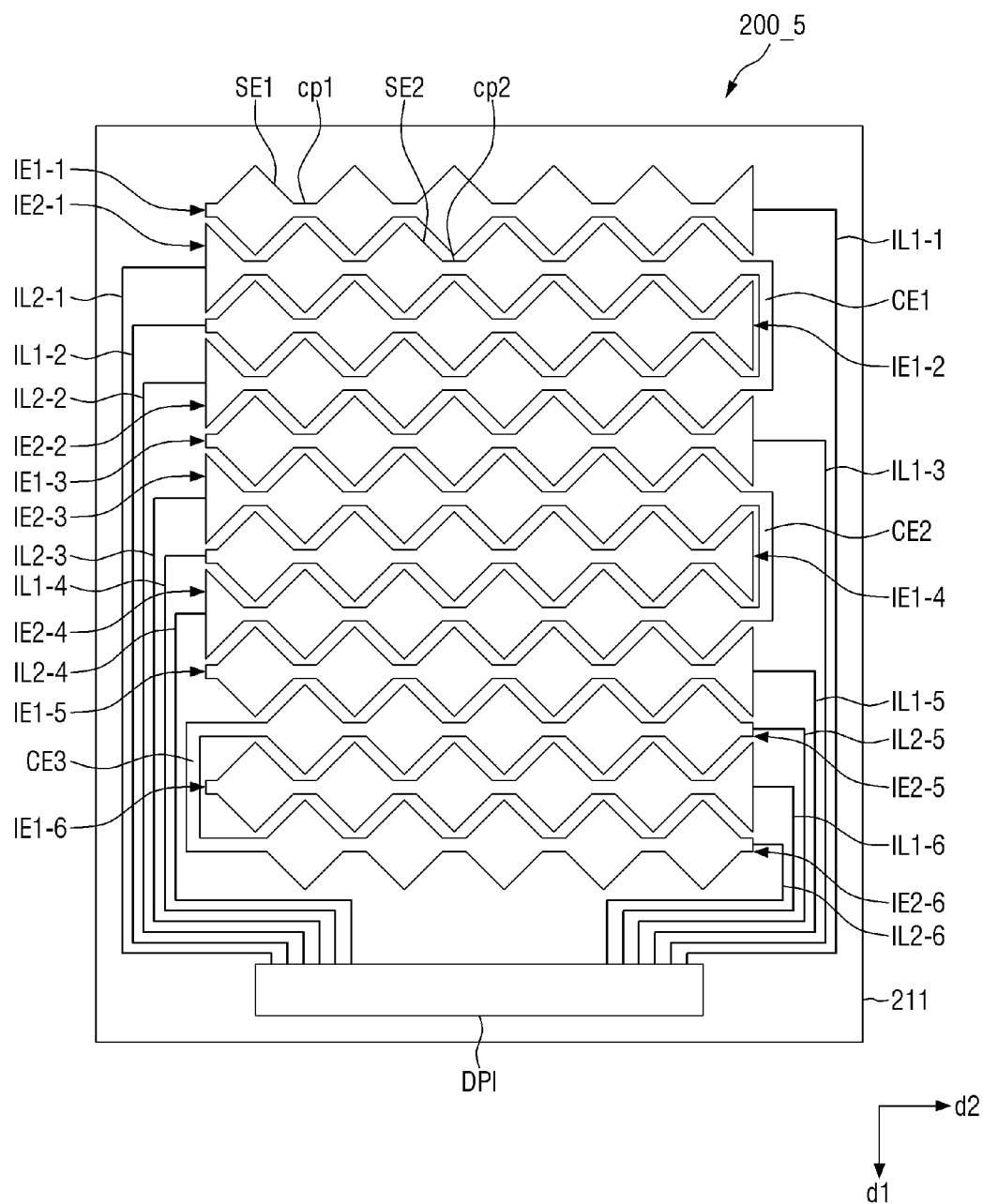
FIG. 9 is a plan view showing an exemplary embodiment of the first substrate from among components of the input sensing panel shown in FIG. 1.

FIG. 9 is a plan view showing an exemplary embodiment of the first substrate from among components of the input sensing panel shown in FIG. 1 according to an exemplary embodiment of the present invention.

In an exemplary embodiment, at least two sensing electrodes from among the plurality of second sensing electrodes IE2-1 to IE2-6 are connected to each other through a connection electrode. In an exemplary embodiment, the two sensing electrodes connected to each other through the connection electrode form one strain gauge.

An example will be described. In an exemplary embodiment, the second sensing electrode IE2-1 and the second sensing electrode IE2-2 disposed in different rows are directly connected to each other through the first connection electrode CE1. The second sensing electrode IE2-1 and the second sensing electrode IE2-2 may be directly connected through a first connection electrode CE1 to form a first strain gauge.

Further, in an exemplary embodiment, the second sensing electrode IE2-3 and the second sensing electrode IE2-4 are directly connected to each other through a second connection electrode CE2. The second sensing electrode IE2-3 and the second sensing electrode IE2-4 may be directly connected through the second connection electrode CE2 to form a second strain gauge. In an exemplary embodiment, the second sensing electrode IE2-5 and the second sensing electrode IE2-6 are directly connected to each other through the third connection electrode CE3. The second sensing electrode IE2-5 and the second sensing electrode IE2-6 may be directly connected through the third connection electrode CE3 to form a third strain gauge. These strain gauges may be connected to a wheat stone bridge, as described in further detail below.

The positions of the connecting electrodes are not particularly limited. For example, although it is shown in FIG. 9 that the first connection electrode CE1 and the second connection electrode CE2 are disposed on different side surfaces from the third connection electrode CE3, exemplary embodiments of the present invention are not limited thereto. Further, unlike the exemplary embodiment illustrated in FIG. 9, in an exemplary embodiment, the second sensing electrodes that are not adjacent to each other may be directly connected to each other to form a strain gauge. In this specification, it will be described that the adjacent second sensing electrodes are directly connected to each other to form a strain gauge.

Further, although three strain gauges are shown in FIG. 9, exemplary embodiments of the present invention are not limited thereto. For example, in an exemplary embodiment, the display device is configured such that a plurality of strain gauges are arranged in an area in which a touch pressure is required to be sensed, and thus, the touch pressure can be sensed. An example will be described with reference to FIG. 10.

Figure 10:
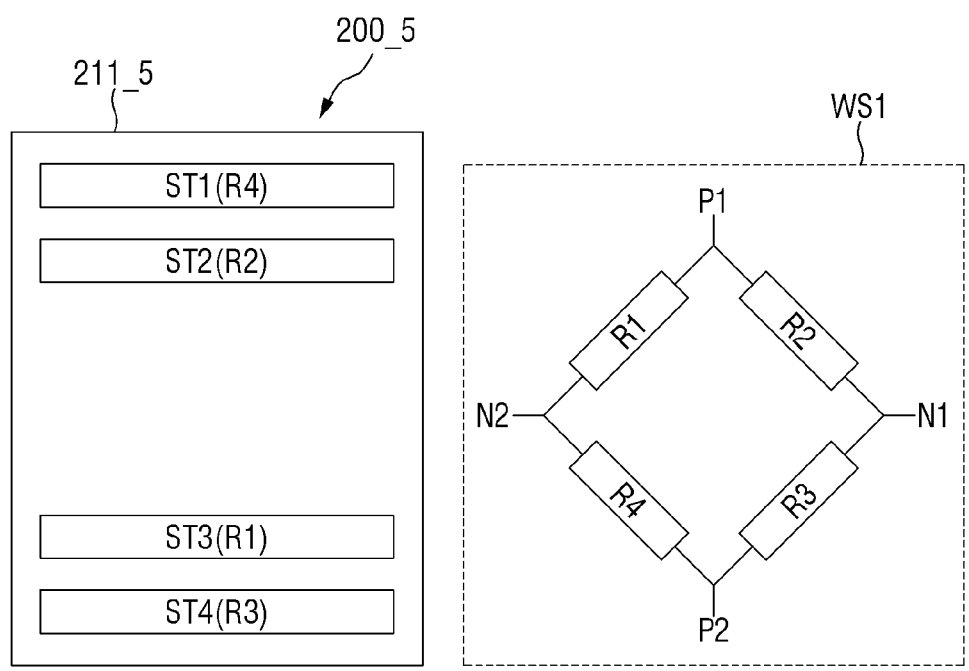
FIG. 10 is a view for describing a method of sensing a touch pressure through a resistance change in an input sensing panel including the first substrate shown in FIG. 9.

FIG. 10 is a view for describing a method of sensing a touch pressure through a resistance change in an input sensing panel including the first substrate shown in FIG. 9 according to an exemplary embodiment of the present invention.

Referring to FIG. 10, in an exemplary embodiment, an input sensing panel 200_5 includes first to fourth strain gauges ST1 to ST4. In an exemplary embodiment, the first and second strain gauges ST1 and ST2 are disposed at the upper side of a first base layer 211_5, and the third and fourth strain gauges ST3 and ST4 are disposed at the lower side of the first base layer 211_5. Each of the first to fourth strain gauges ST1 to ST4 corresponds to one resistor constituting a first Wheatstone bridge circuit unit WS1.

For example, in an exemplary embodiment, the first strain gauge ST1 serving as a fourth resistor R4, the second strain gauge ST2 serving as a second resistor R2, the third strain gauge ST3 serving as a first resistor R1, and the fourth strain gauge ST4 serving as a third resistor R3 constitute the first Wheatstone bridge circuit unit WS1. Further, each of the first power source P1 and the second power source P2 of the first Wheatstone bridge circuit unit WS1 may receive a voltage from the outside. In an exemplary embodiment, the second power source P2 may receive a constant voltage. In exemplary embodiments, the constant voltage may be a reference voltage such as, for example, a ground voltage.

In an exemplary embodiment, one end of the first resistor R1 is connected to the first power source P1, and the other end thereof is connected to a second terminal N2. Further, one end of the second resistor R2 is connected to the first power source P1, and the other end thereof is connected to the first terminal N1. Further, one end of the third resistor R3 is connected to the first terminal N1, and the other end thereof is connected to the second power source P2. Further, one end of the fourth resistor R4 is connected to the second power source P2, and the other end thereof is connected to the second terminal N2.

The voltage level applied to each resistance element and the first power source P1 and the second power source P2 may be adjusted such that the potential difference between the first terminal N1 and the second terminal N2 is about 0 V. As a result, no current flows between the first terminal N1 and the second terminal N2.

Thereafter, when a user applies a touch pressure to a part of an area in which the first to fourth strain gauges ST1 to ST4 are arranged, resistance values of some of the resistors R1 to R4 corresponding to the first to fourth strain gauges ST1 to ST4 are changed. For example, from among the first to fourth strain gauges ST1 to ST4, the length of the strain gauge to which the touch pressure is applied may be increased by the touch pressure, and thus, the corresponding resistance value may be changed.

Due to the change in resistance, a voltage difference is generated between the first terminal N1 and the second terminal N2, and thus, the current corresponding to the voltage difference flows. The touch pressure of a user may be detected by the measurement of the voltage difference or the amount of current flowing. In an exemplary embodiment, the touch driving circuit may detect the touch pressure of the user based on the measurement of the voltage difference or the amount of current.

The position of the first Wheatstone bridge circuit unit WS1 is not particularly limited. For example, in an exemplary embodiment, the first Wheatstone bridge circuit unit WS1 is formed by adjusting the arrangement position of lines constituting each resistance in the first non-display area NTP1. In an exemplary embodiment, the first Wheatstone bridge circuit unit WS1 is formed on a flexible substrate electrically connected to the first touch pad unit DP1.

Unlike the exemplary embodiment shown in FIG. 10, in the input sensing panel 200_5, a plurality of Wheatstone bridge circuit units may be formed. For example, according to exemplary embodiments, the number of Wheatstone bridge circuit units, the number of strain gauges constituting each Wheatstone bridge circuit unit, the position of the strain gauges, the number of fixed resistors, etc. may be varied depending on the area in which the touch pressure of the user is required to be detected.

Figure 11:
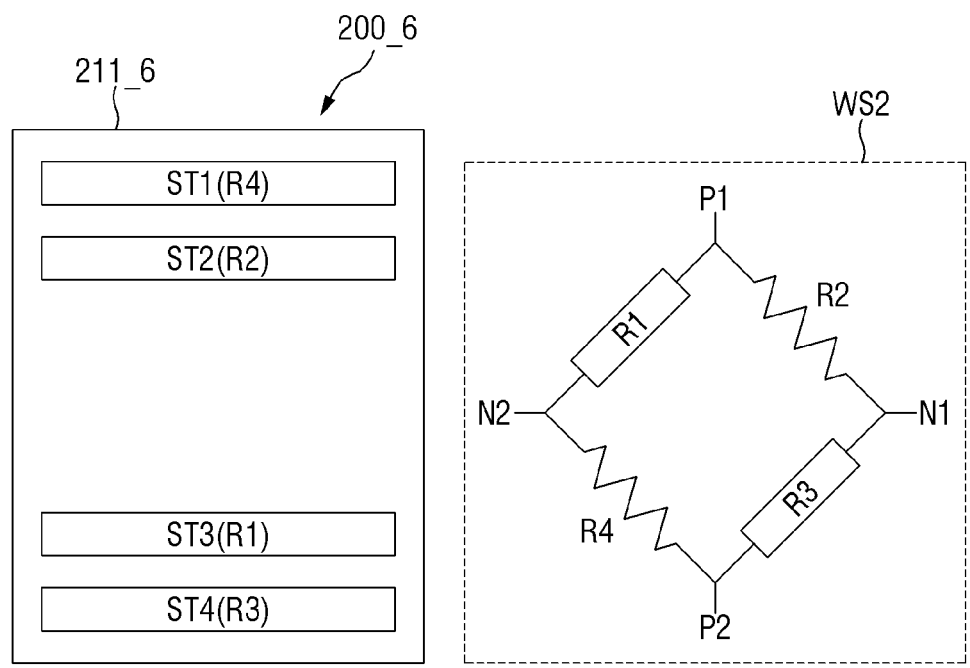
FIG. 11 is a view for describing an exemplary embodiment of the method of sensing a touch pressure through a resistance change in an input sensing panel including the first substrate shown in FIG. 9.

FIG. 11 is a view for describing an exemplary embodiment of the method of sensing a touch pressure through a resistance change in an input sensing panel including the first substrate shown in FIG. 9 according to an exemplary embodiment of the present invention.

Referring to FIG. 11, in an exemplary embodiment, each of the third and fourth strain gauges ST3 and ST4 corresponds to one resistor constituting a second Wheatstone bridge circuit unit WS2.

For example, in an exemplary embodiment, the third strain gauge ST3 serving as the first resistor R1 and the fourth strain gauge ST4 serving as the third resistor R3 constitute the second Wheatstone bridge circuit unit WS2. Further, in an exemplary embodiment, the fourth resistor R4 has a fixed resistance value, and the second resistor R2 is formed as a variable resistor. The resistance value of the second resistor R2 and the voltage level applied to the first power source P1 and the second power source P2 may be adjusted such that the potential difference between the first terminal N1 and the second terminal N2 is about 0 V. Therefore, no current flows between the first terminal N1 and the second terminal N2.

Thereafter, when a user applies a touch pressure to a part of an area in which the third and fourth strain gauges ST3 and ST4 are arranged, resistance values of at least some of the resistors R3 and R4 corresponding to the third and fourth strain gauges ST3 and ST4 are changed.

For example, the lengths of the third and fourth strain gauges ST3 and ST4 may be increased by the external touch pressure, and thus, the corresponding resistance values may be changed.

In an exemplary embodiment, the first and second strain gauges ST1 and ST2 are connected to a separate Wheatstone bridge circuit unit. Accordingly, a pressure sensor may be formed in one input sensing panel 200_6 in a multi-channel manner.

In an exemplary embodiment, the first and second strain gauges ST1 and ST2 are disposed at the upper side of a first base layer 211_6, and the third and fourth strain gauges ST3 and ST4 are disposed at the lower side of the first base layer 211_6.

Figure 12:
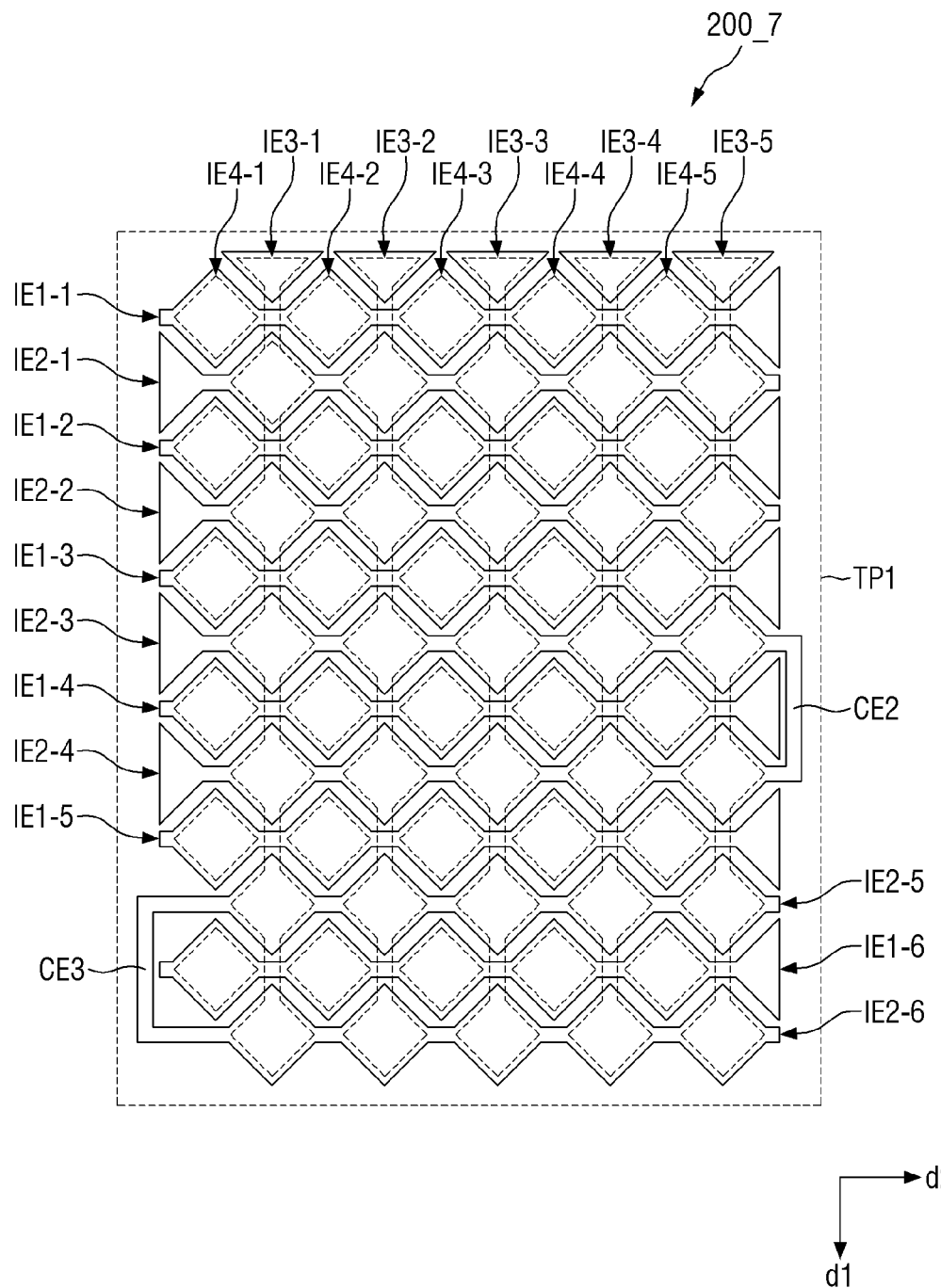
FIG. 12 is a plan view showing an exemplary embodiment of the first substrate from among components of the input sensing panel shown in FIG. 1.

FIG. 12 is a plan view showing an exemplary embodiment of the first substrate from among components of the input sensing panel shown in FIG. 1 according to an exemplary embodiment of the present invention.

Referring to FIG. 12, in an exemplary embodiment, an input sensing panel 200_7 is different from the input sensing panel 200_5 and 200_6 shown in FIGS. 9 and 10 in that the input sensing panel 200_7 does not include the first connection electrode CE1 for connecting the second sensing electrode IE2-1 and the second sensing electrode IE2-2 to each other.

Accordingly, the input sensing panel 200_7 may measure a touch pressure through capacitance sensing in an area in which the second sensing electrode IE2-1 and the second sensing electrode IE2-2 are disposed. In contrast, the input sensing panel 200_7 may measure the touch pressure through a resistance change in an area in which the second sensing electrode IE2-5 and the second sensing electrode IE2-6 connected through the third connection electrode CE3 are disposed and an area in which the second sensing electrode IE2-3 and the second sensing electrode IE2-4 connected through the second connection electrode CE2 are disposed.

That is, in an exemplary embodiment, the input sensing panel 200_7 measures the touch pressure using both the capacitance and the resistance change.

As described above, according to exemplary embodiments of the present invention, both touch position and touch pressure may be detected by a single module of an input sensing device and a display including the input sensing device.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. An input sensing device, comprising:
a first base layer;
a first sensing electrode on the first base layer;
a second sensing electrode which is disposed on the first base layer and does not overlap the first sensing electrode
a third sensing electrode which is disposed on the second sensing electrode and overlaps the second sensing electrode; and
a fourth sensing electrode which is disposed on a same layer as the third sensing electrode and overlaps the first sensing electrode,
wherein a constant voltage is applied to the third sensing electrode during a touch pressure sensing operation in which a touch pressure is sensed by the second sensing electrode and the third sensing electrode,
wherein the second sensing electrode is in a floating state during a touch position sensing operation in which a touch position is sensed by the first sensing electrode, the third sensing electrode, and the fourth sensing electrode.

2. The input sensing device of claim 1,
wherein a driving signal for sensing the touch position is applied to the third sensing electrode during the touch position sensing operation.

3. The input sensing device of claim 1, further comprising:
a touch driving circuit that senses a change in capacitance between the second sensing electrode and the third sensing electrode during the touch pressure sensing operation.

4. The input sensing device of claim 3,
wherein the touch driving circuit senses a change in capacitance between the third sensing electrode and the fourth sensing electrode and the first sensing electrode during the touch position sensing operation.

5. The input sensing device of claim 1,
wherein the fourth sensing electrode is a floating electrode.

6. The input sensing device of claim 1,
wherein the second sensing electrode is provided in a plural, and
wherein at least two second sensing electrodes are directly connected to each other.

7. The input sensing device of claim 6,
wherein the at least two second sensing electrodes directly connected to each other constitute a first strain gauge, and
the input sensing device further comprises a Wheatstone bridge circuit electrically connected to the first strain gauge.

8. The input sensing device of claim 1,
wherein the first sensing electrode and the second sensing electrode are alternately arranged along a first direction.

9. The input sensing device of claim 1, further comprising:
a second base layer on which the third sensing electrode and the fourth sensing electrode are arranged; and
an insulating layer disposed between the first base layer and the second base layer, and covering the first sensing electrode and the second sensing electrode.

10. A display device, comprising:
a display panel; and
an input sensing member disposed over the display panel, wherein the input sensing member comprises:
a first sensing electrode;
a second sensing electrode which is disposed on a same first layer as the first sensing electrode and does not overlap the first sensing electrode;
a third sensing electrode which is disposed on the second sensing electrode and overlaps the second sensing electrode; and
a fourth sensing electrode which is disposed on a same second layer as the third sensing electrode and overlaps the first sensing electrode,
wherein a constant voltage is applied to the third sensing electrode during a touch pressure sensing operation in which a touch pressure is sensed by the second sensing electrode and the third sensing electrode,
wherein the second sensing electrode is in a floating state during a touch position sensing operation in which a touch position is sensed by the first sensing electrode, the third sensing electrode, and the fourth sensing electrode.

11. The display device of claim 10, wherein a driving signal for sensing the touch position is provided to the third sensing electrode during the touch position sensing operation.

12. The display device of claim 11, further comprising:
a touch driving circuit that senses a change in capacitance between the third sensing electrode and the fourth sensing electrode and the first sensing electrode during the touch position sensing operation.

13. The display device of claim 10, further comprising:
a touch driving circuit that senses a change in capacitance between the second sensing electrode and the third sensing electrode during the touch pressure sensing operation.

14. The display device of claim 10, wherein the fourth sensing electrode is a floating electrode.

15. The display device of claim 10, wherein the first sensing electrode is in a floating state during the touch pressure sensing operation.

16. The display device of claim 10, wherein the second sensing electrode is provided in a plural, and
wherein at least two second sensing electrodes are directly connected to each other.

17. The display device of claim 16, wherein the at least two second sensing electrodes directly connected to each other constitute a first strain gauge, and
the input sensing member further comprises a Wheatstone bridge circuit electrically connected to the first strain gauge.

18. The display device of claim 10, wherein the first sensing electrode and the second sensing electrode are disposed directly on an upper surface of the display panel.

19. The display device of claim 10, wherein an occupied area of the third sensing electrode is larger than an occupied area of the first sensing electrode.

* * * * *